Nov. 30, 1937. R. CHILTON 2,100,630
TRANSMISSION
Filed Aug. 13, 1936 3 Sheets-Sheet 1

INVENTOR
ROLAND CHILTON
BY
ATTORNEY

Nov. 30, 1937.　　　　R. CHILTON　　　　2,100,630
TRANSMISSION
Filed Aug. 13, 1936　　　　3 Sheets-Sheet 2

INVENTOR
ROLAND CHILTON
BY
ATTORNEY

Nov. 30, 1937.  R. CHILTON  2,100,630
TRANSMISSION
Filed Aug. 13, 1936  3 Sheets-Sheet 3
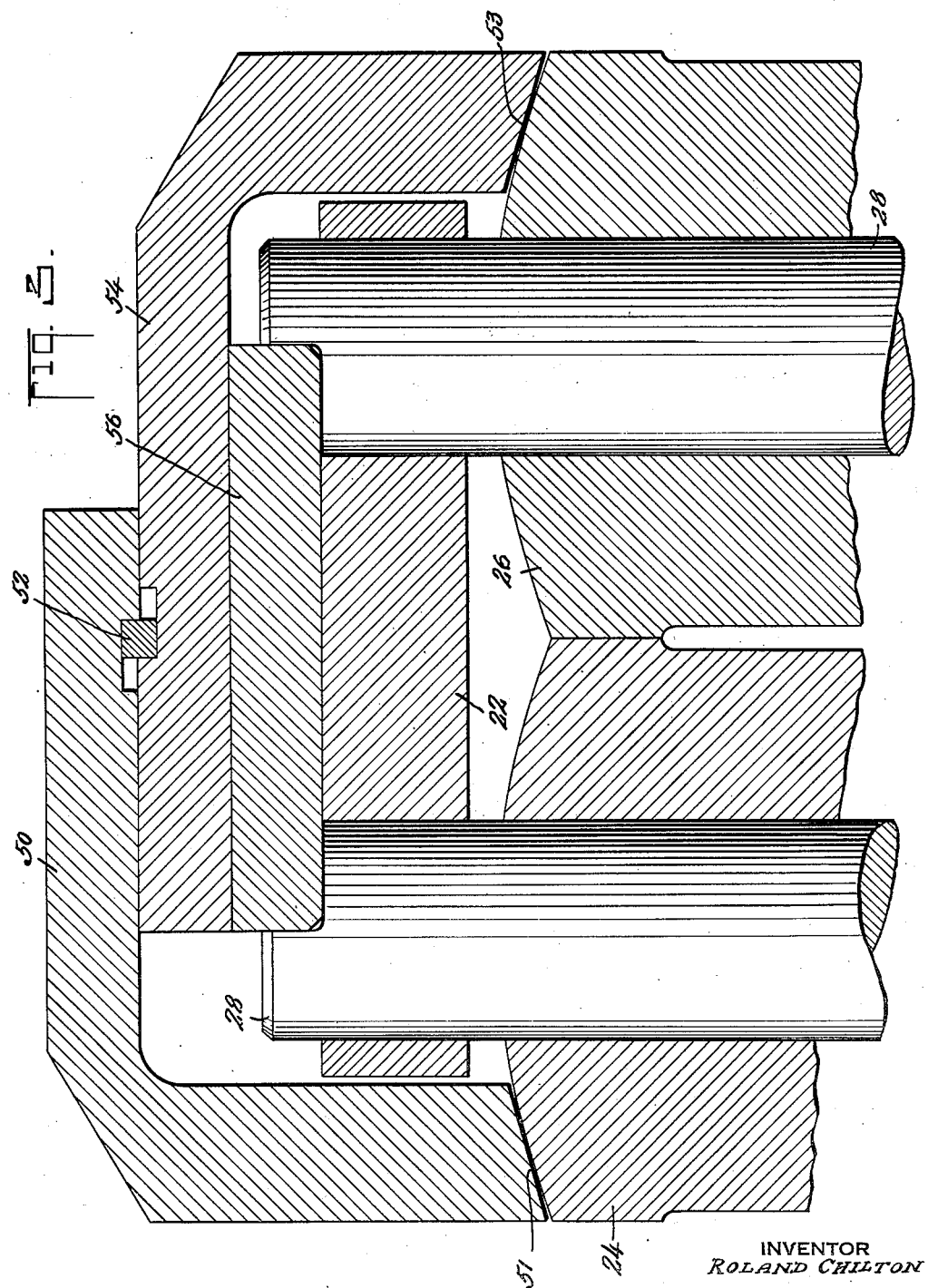
INVENTOR
ROLAND CHILTON
BY
ATTORNEY Patented Nov. 30, 1937

2,100,630

UNITED STATES PATENT OFFICE 2,100,630

TRANSMISSION

Roland Chilton, Ridgewood, N. J.

Application August 13, 1936, Serial No. 95,732

10 Claims. (Cl. 74—281)

My invention relates to variable speed transmissions, and more particularly to variable speed transmissions of the twin roller type disclosed in my Patents Numbers 2,040,830; 2,040,831; 2,040,832; 2,040,833, and 2,041,284, and comprises improvements for use in connection with such transmissions.

This type of transmission includes planetary rollers arranged in paired contact on spindles mounted in a rotating cage, and requires thrust bearings to resist the centrifugal force generated by the rollers. In developing this type of transmission for high rotative cage speeds (5000 R. P. M. and over) difficulties have been experienced with plain type thrust washers, limiting the durable speed and developing undesirable friction and wear, besides requiring copious pressure lubrication which may present an excessive quantity of oil to the rollers.

Accordingly, a prime object of the present invention is to provide a simplified, high capacity, anti-friction thrust means for the rollers, and one which will require a minimum of lubrication.

The invention further comprises a simplified transmission organization using a single ratio-control piston means, suited to certain uses as where the driven means has predetermined relationships between speed and torque.

Another object of the invention is to provide a simplified hydraulic control valve to give very fine regulation of control piston position with light operating pressures.

Figure 1:
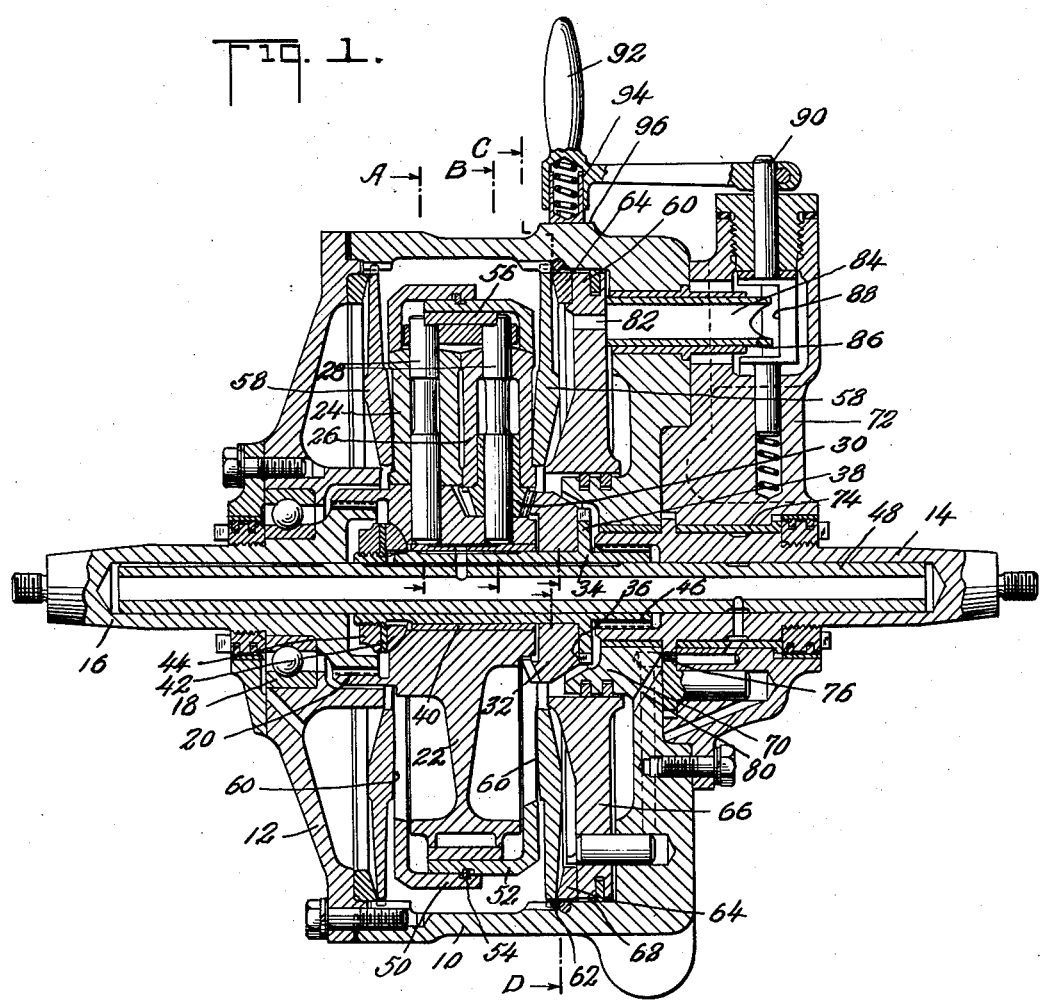
Figure 2:
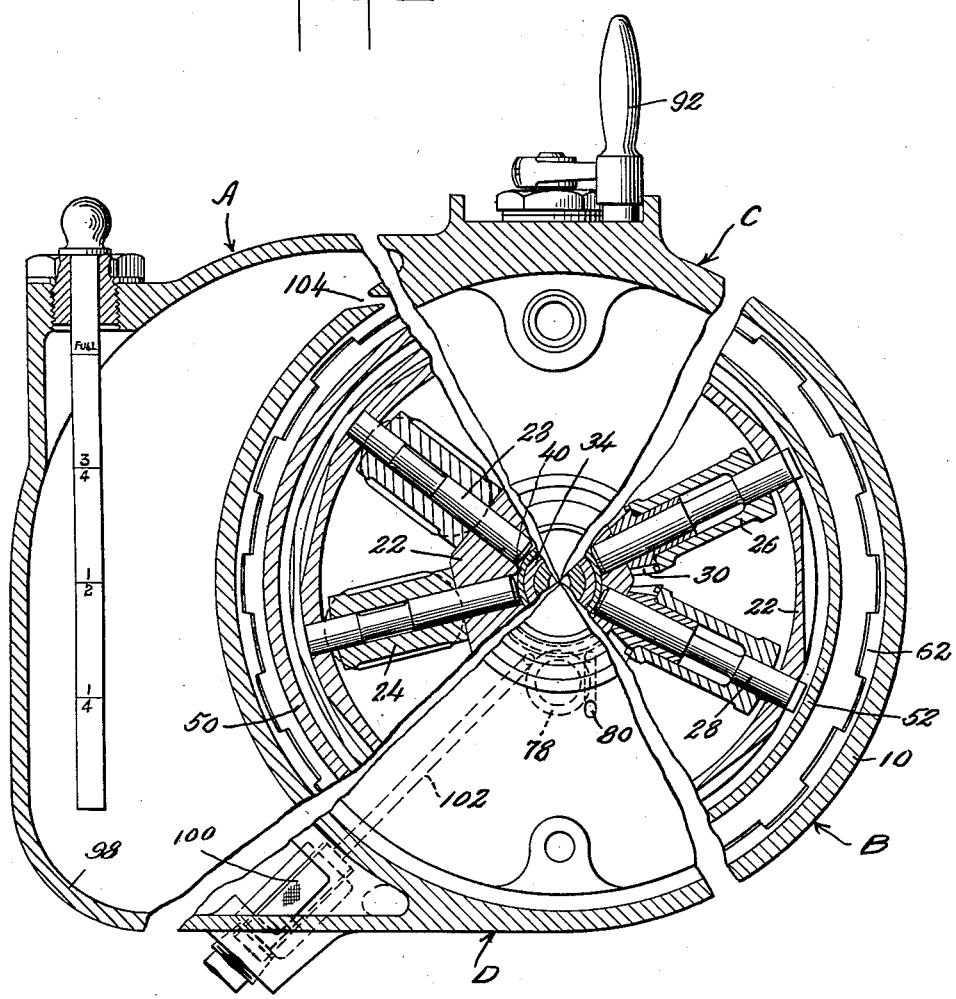

Other objects and advantages will be obvious from or will be pointed out in the following description with reference to the drawings, in which:

Fig. 1 is a transverse longitudinal sectional view of the transmission;

Fig. 2 comprises transverse segmental sections in which:

Segment A is on the line A—A of Fig. 1;
Segment B is on the line B—B of Fig. 1;
Segment C is on the line C—C of Fig. 1;
Segment D is on the line D—D of Fig. 1; and
Fig. 3 is a fragmentary section through thrust rings shown to enlarged scale.

In these drawings, 10 designates a main housing, and 12 an end cover from which project shafts 14 and 16 connected by the variable speed means of the transmission, of which shafts, for convenience of description, 16 will be referred to as the driving or input shaft, and 14 as the driven or output shaft, although, of course, these functions may be reversed according as it is desired to operate as a step-up or step-down transmission.

The driving shaft 16 is supported on a suitable bearing 18 in the end cover 12, and is slidably engaged, by splines 20, with a cage 22 in which are mounted two sets of rollers 24, 26 on spindles 28 in paired contact, as shown; the right hand rollers 26 being equipped at their inner ends with bevel pinions 30 meshed with a (preferably non-metallic) driven sun gear 32 mounted on a tubular shaft 34 by means of lugs 36 engaging a flange 38. The cage 22 runs freely on a bushing 40 on the tubular shaft 34, which shaft is equipped at its left hand end with thrust washers 42 secured by a nut 44 and, at its right hand end, with splines 46 drivably engaged in mating splines at the inner end of the driven shaft 14.

A central floating stabilizing and aligning spindles 48 is engaged within bores in the driving shaft 16; the hollow gear shaft 34; and the driven shaft 14. It will be seen that long bearing lengths are thus afforded to maintain these parts in alignment against displacement under side loads which may be applied by couplings, gears, etc., which may be applied to the extended shaft ends 14, 16.

At high operating speeds the rollers 24, 26 generate high centrifugal thrust which is sustained, according to this invention, by floating annular thrust rings 50, 52, assembled against axial separation by a locking ring 54. As seen in the enlarged view of Fig. 3, the ends of the rollers are formed to a spherical radius and the contacting surfaces or raceways 51, 53, of the thrust rings, are formed as cones having tangential contact with these spherical end surfaces, whereby a single pair of thrust rings takes the centrifugal force of all the rollers (fourteen in this case) by anti-friction rolling contact, thus eliminating the friction wear, and lubrication requirements of fourteen individual thrust washers, such as are used in the prior art.

It is pointed out that, in order to distribute the contact loads over a relatively large number of rollers, these rollers are limited in diameter wherefore their rotational speed is relatively high (six or seven times cage speed with the proportions shown) but that the floating rings of this invention, due to their relatively great diameter, will rotate at relatively low speeds on the cage. The use of conventional ball type thrust bearings for each roller involves excessive ball speeds due to the high speed of the rollers and the space limitations on the size of balls that may be used.

The spindles 28 are secured against end motion by a band 56 which may be also utilized as a bearing bushing to centralize the thrust rings and rollers.

Engaged with each set of rollers 24, 26, are similar opposed discs 58, having crowned contact faces 60 rockable on the rollers by elastic distortion of the discs to slightly conical shape, as in the well known "Belleville" or disc type springs. The outer peripheries of these discs are slidably splined at 62 in the housing 10 and engage similar annular abutment rings 64 secured in the end cover 12, and on an annular piston 66, slidable in an annular cylinder in the main housing 12, comprising a bore 68 and a hub 70 equipped with suitable oil sealing rings, as shown.

A pump and control valve housing 72 is secured to the main housing 12 and incorporates a bushing 74 for the shaft 14 which is equipped with a pump gear 76 meshed with a pump pinion 78, which pump delivers oil to the piston 76 by a diagonal passage 80. The piston is provided with an escape hole 82 around which there seats a tubular control valve 84 having a V pointed outer end 86, engaging a flatted cam portion 88, on a control shaft 90, equipped with an operator's control handle 92 having a spring loaded friction plunger 94 engaging a suitable quadrant face 96 on the housing 10.

In segment A, Fig. 2, will be seen an oil reservoir 98 equipped with a filter 100 and serving the oil pump 76—78, by a suction passage 102 (segment D). A high level catchment slot 104 returns oil to the reservoir 98 due to the action of the rapidly rotating roller cage assembly.

The operation of the device is as follows: The radius of contact of the rollers 24, 26 upon the crowned contact surfaces 60 of the rotationally fixed discs 58, is determined by the distorted position of these discs. It will be seen the bevel pinions 30 and the driven bevel gear 32 have a fixed pitch cone angle, while the pitch cone angle subtended by the contacts of the rollers 24, 26 on the disc faces 60 is variable, as the radius of contact is varied and the driving ratio of the transmission varies with this pitch cone angle relationship.

The oil delivered by the pump 76, 78 has to escape between the valve 84 and the piston 66 so that there will always be a very slight opening or separation between these parts, sufficient to pass the pump delivery under the pressure required to distort the elastic discs 58, whatever this pressure may be. Assuming the control lever 92 is operated to move the control valve 84 to the left, Fig. 1, there is an instantaneous tendency to close the minute valve opening, which causes an equally instantaneous rise in the hydraulic pressure (since the oil has to escape past the valve continuously) wherefore the minute valve opening is instantly restored, so that the piston accurately follows the rate of movement of the valve 84, maintaining the minute valve opening automatically, whereby the piston is hydraulically stabilized in the position corresponding to any setting of the valve 84. The hollow construction of the valve eliminates hydraulic reactions thereon due to its own area, wherefore there are no pressure reactions on the control lever 92.

The stiffness of the elastic discs determines the contact loads in the various radio positions, this factor being proportioned to the torque and speed relationships desired. The actual contact load at any instant may be conveniently read on a pressure gauge connected to the pressure side of the hydraulic system, this pressure being a function of the stiffness and deflected position of the elastic discs, but being independent of the characteristics of the pump 76, 78 except that this must have sufficient capacity to attain the maximum necessary pressure, in spite of incidental leakage at the oil seals; all the surplus capacity of the pump having to pass away at the control valve.

The discs 58 have the same geometrical form and, therefore, have identical elastic properties so that they are equally distorted under the pressure from the piston 66, and the equal and opposite reactions from the abutment rings 64. The cage is free to float axially, as required by the distortion of the discs, on account of the splined connections previously described.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a transmission, in combination, a disc, planetary power transmitting rollers contacting said disc and subject to centrifugal thrust, and anti-friction thrust means for said rollers comprising sphericalized roller ends, and thrust rings having conical raceways contacting said ends.

2. In a transmission, in combination, two mutually contacting sets of power transmitting rollers having sphericalized ends, a cage supporting said rollers, and floating thrust ring means tangentially engaging said ends.

3. In a transmission, in combination, a disc member, a rotary roller carrier member, planetary power transmission rollers in said roller carrier member, and thrust rings rotatable relative to said members, said rollers having sphericalized ends engaging tangentially with conical raceways formed in said rings to comprise an anti-friction roller thrust means.

4. In a transmission, in combination, a cage, a plurality of rollers therein contacted with each other in pairs and having sphericalized ends, and floating thrust ring means in rolling engagement with said roller ends.

5. In a transmission, in combination, a pair of mutually opposed annular distortable discs, rollers having a crowned contact relation with said discs shiftable by said distortion, a housing, a hydraulic piston in said housing, and abutment rings respectively in said housing and on said piston engaging peripheries of respective discs.

6. In a transmission, in combination, a housing, a piston therein, abutment rings respectively in said housing and on said piston, opposed distortable annular discs engaging said abutment rings and distortable by movement of said piston, and roller means drivably cooperating with said discs and having a contact therewith shiftable by said distortion.

7. In a transmission, in combination, a piston having an escape hole therein, a pump hydraulically connected with said piston, a control valve cooperating with said hole to control the position of the piston, means to control the position of said valve, a housing means for the valve, and means connecting the piston end of said valve to said housing to balance the hydraulic pressure on the valve.

8. In a transmission, rollers and disc members drivably contacted one with the other, and a thrust ring rollably engaging with the ends of said rollers and rotationally floated relative to said members.

9. In a transmission, in combination, rollers, a carrier member mounting said rollers on radial axes, and means to prevent radial displacement of said rollers comprising a ring engaging ends of said rollers and rotatable upon said carrier member.

10. In a transmission, in combination, a disc member, rollers, a member carrying said rollers for planetary rolling upon the disc, and a thrust ring engaging the rollers and rotationally floated relative to said members.

ROLAND CHILTON.